US006068055A

United States Patent [19]

Chatterji et al.

[11] Patent Number: 6,068,055

[45] Date of Patent: May 30, 2000

[54] WELL SEALING COMPOSITIONS AND METHODS

[75] Inventors: Jiten Chatterji; David D. Onan, both of Duncan; Roger S. Cromwell, Walters; Bobby J. King, Duncan, all of Okla.

[73] Assignee: Halliburton Energy Services, Inc., Duncan, Okla.

[21] Appl. No.: 09/107,497

[22] Filed: Jun. 30, 1998

[51] Int. Cl.[7] .......... E21B 33/138

[52] U.S. Cl. .......... 166/293; 106/790; 106/791; 166/295; 523/130

[58] Field of Search .......... 166/292, 293, 166/295; 106/790, 791; 507/269; 523/130; 524/4

[56] References Cited

U.S. PATENT DOCUMENTS

| | | | |
|---|---|---|---|
| 4,072,194 | 2/1978 | Cole et al. | 166/295 |
| 4,272,384 | 6/1981 | Martin | 166/295 |
| 4,483,888 | 11/1984 | Wu | 427/336 |
| 4,897,119 | 1/1990 | Clarke . | |
| 5,361,841 | 11/1994 | Hale et al. | 166/293 |
| 5,453,123 | 9/1995 | Burge et al. | 106/790 X |
| 5,458,195 | 10/1995 | Totten et al. | 166/293 |
| 5,479,987 | 1/1996 | Hale | 166/293 |
| 5,499,677 | 3/1996 | Cowan | 166/293 |
| 5,547,027 | 8/1996 | Chan | 166/295 |
| 5,569,324 | 10/1996 | Totten et al. | 106/790 X |
| 5,673,753 | 10/1997 | Hale et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |

*Primary Examiner*—George Suchfield
*Attorney, Agent, or Firm*—Craig W. Roddy; C. Clark Dougherty, Jr.

[57] ABSTRACT

The present invention provides improved well sealing compositions and methods. The compositions are basically comprised of slag cement, water, a slag cement set activator, a hardenable epoxide containing material and an epoxide containing material hardening agent.

16 Claims, No Drawings

WELL SEALING COMPOSITIONS AND METHODS

BACKGROUND OF THE INVENTION

1. Field of the Invention

The present invention relates to well sealing compositions and methods, and more particularly, but not by way of limitation, to such compositions and methods for performing sealing operations in wells.

2. Description of the Prior Art

Hydraulic cement compositions are commonly utilized in oil, gas and water well sealing applications during completion and remedial operations. For example, hydraulic cement compositions are used in primary cementing procedures whereby pipes such as casing are cemented in well bores. In performing primary cementing, a hydraulic cement composition is pumped into the annular space between the walls of a well bore and the exterior of a pipe disposed therein. The cement composition is permitted to set in the annular space thereby forming an annular sheath of hardened substantial impermeable cement therein. The cement sheath physically supports and positions the pipe in the well bore and seals the pipe to the walls of the well bore whereby the undesirable migration of fluids between zones or formations penetrated by the well bore is prevented.

Hydraulic sealing compositions used for sealing subterranean formations or zones in wells must have particular properties. For example, the sealing compositions must be capable of being mixed and pumped without prematurely gelling, have sufficiently long pumping times to be placed in subterranean formations or zones, have high compressive and tensile strengths and have a high degree of resiliency after setting or hardening.

The American Petroleum Institute (API) has set standards for different classes for oil well cements to insure that the cement slurries formed with them have required properties. The API cements are Portland cements and because of the strict requirements placed on them, they are generally more difficult to produce and more expensive than other sealing compositions such as slag cement compositions.

Slag cement has heretofore been utilized to form hydraulic cement slurries used for cementing subterranean formations or zones in wells. Slag cement is produced from slag which is formed in the manufacture of iron. The iron is produced from iron ore and limestone flux in a blast furnace and slag is a by-product therefrom. The essential components of slag are the same oxides that are present in Portland cement, e.g., lime, silica and alumina, but their proportions are different. The slag comes from the blast furnace as a molten stream at a temperature of about 1400° F. to 1500° F. The slag is chilled very rapidly either by pouring it into a large excess of water or by contacting it with jets of water or a mixture of air and water. The quenching prevents the slag from rapidly crystallizing and causes it to solidify as a glassy material. Simultaneously, the quenching breaks up the material into small particles or grains. Granulated slag cement alone has a negligible cementing action until an alkaline activator is present, e.g. hydrated lime.

While a slag cement composition has substantial compressive strength after it sets, it generally includes extensive microcracks which decrease its flexural strength and causes it to be permeable to gasses and water. It has been shown that the hydration products of alkali activated slag contain an unstable gel phase which causes shrinking during setting and the formation of microcracks. That is, the alkali activated slag consists of two principal phases during hydration, one of which is calcium silicate hydrate. The other phase is rich in silica and has properties similar to silica gel. The silica phase is unstable and expels water resulting in irreversible shrinkage during setting. This shrinking produces the microcracks which in turn cause increased permeability and decreased tensile strength in the set slag cement.

Thus, there is a need for improved well sealing compositions and methods of using the compositions which are formed of relatively inexpensive slag cement, but which do not shrink and form micro cracks upon setting.

SUMMARY OF THE INVENTION

The present invention provides improved well sealing compositions and methods which meet the need described above and overcome the deficiencies of the prior art. That is, the well sealing compositions of this invention are formed of slag cement but do not shrink and form microcracks upon setting.

The well sealing compositions of this invention are basically comprised of slag cement, water, a slag cement set activator, a hardenable epoxide containing material and an epoxide containing material hardening agent. Upon setting and hardening, the sealing compositions do not contain microcracks, are essentially impermeable, have good compressive and tensile strengths and are resilient.

The methods of the present invention for sealing a subterranean zone penetrated by a well bore basically comprises the steps of preparing a sealing composition as described above, placing the sealing composition in the subterranean zone to be sealed and then allowing the slag cement to set and the epoxide containing material to harden.

It is, therefore, a general object of the present invention to provide improved well sealing compositions and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides improved slag cement well sealing compositions which set into substantially impermeable masses without the formation of microcracks.

The sealing compositions are basically comprised of slag cement, water, a slag cement set activator, a hardenable epoxide containing material and an epoxide containing material hardening agent. The inclusion of the hardenable epoxide containing material and a hardening agent for the material in the sealing compositions reduces or eliminates cracking of the compositions during setting and hardening, decreases or eliminates shrinking upon setting, produces a set and hardened sealing composition which is substantially impermeable and significantly increases the tensile and flexural strengths of the sealing composition as compared to the heretofore utilized slag cement compositions.

The slag cement used in accordance with the present invention is a granulated blast furnace by-product formed in the production of iron and is broadly comprised of the oxidized impurities found in iron ore. During the operation of a blast furnace to remove iron from iron ore, a molten waste slag product is formed. By preventing the molten product from crystallizing and thereby losing its energy of crystallization, a non-crystalline glassy material is formed. The non-crystalline, glassy material, which has also been described as a vitreous substance free from crystalline materials, is capable of exhibiting some hydraulic activity upon being reduced in size by grinding to a fine particle size in the range of from about 1 to about 100 microns.

As mentioned, the molten blast furnace slag is prevented from crystallizing by rapid chilling. The rapid chilling can be accomplished by spraying the molten slag with jets of water which causes solidification and the formation of a water slurry of small slag grains. The water is removed from the slurry and the slag grains are ground to a fine particle size having a Blaine fineness in the range of from about 5,000 to about 7,000, most preferably from about 5,200 to about 6,000 square centimeters per gram.

One or more slag cement set activators are added to the slag cement which provide increased hydraulic activity to the slag cement. Such activators include, but are not limited to, hydrated lime, sodium hydroxide, sodium carbonate, sodium silicate, alkali metal sulfates such as sodium sulfate, Portland cement, magnesia and mixtures of the foregoing activators. The activator or activators used are generally combined with the slag cement in an amount in the range of from about 8% to about 20% by weight of the slag cement, preferably in an amount of about 15%.

A preferred commercially available slag cement which includes a set activator is comprised of particulate slag having a Blaine fineness of about 5,900 square centimeters per gram, a sodium carbonate set activator present in an amount of about 2% by weight of the particulate slag and a dispersant present in an amount of about 1.4% by weight of the slag. Such an activated slag cement is commercially available under the trade designation NEWCEM™ from Blue Circle Atlantic Company of Ravena, N.Y. or under the trade designation AUCEM™ from Lone Star Industries, Inc. of New Orleans, La.

The water used in the cement compositions of this invention can be water from any source provided it does not contain an excess of compounds which adversely react with or otherwise affect other components in the well sealing compositions. For example, the water can be fresh water, salt water, brines or sea water. Also, any available water base fluid which does not adversely react with components in the sealing composition can be substituted for the water. For example, a water based well drilling fluid available at the well site may be utilized either alone or in combination with water. The water used is generally present in the sealing compositions of this invention in an amount sufficient to form a pumpable slurry of the slag cement and other components in the compositions. Preferably, the water is present in the range of from about 30% to about 60% by weight of the slag cement in the compositions, more preferably in an amount of about 46%.

While various hardenable epoxide containing materials can be utilized in accordance with the present invention, particularly suitable such materials include, but are not limited to, epoxide containing liquids such as the diglycidyl ether of 1,4-butanediol, the diglycidyl ether of neopentyl glycol and the diglycidyl ether of cyclohexanedimethanol. A suitable epoxide containing liquid comprised of the diglycidyl ether of 1,4-butanediol is commercially available from the Shell Chemical Company of Houston, Tex. under the trade designation of "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentylglycol is commercially available from Shell Chemical Company under the trade designation "HELOXY®68". This epoxide containing liquid has a viscosity at 25° C. in the range of from about 13 to about 18 centipoises, a molecular weight of about 216 and a one gram equivalent of epoxide per about 130 to about 140 grams of the liquid. A suitable diglycidyl ether of cyclohexane dimethanol is commercially available from Shell Chemical Company under the trade designation "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid. The epoxide containing material utilized is generally included in the sealing compositions of this invention in an amount in the range of from about 3% to about 50% by weight of the slag cement in the compositions, preferably in an amount of about 7%.

A variety of epoxide containing material hardening agents can be utilized in the sealing compositions including, but not limited to, aliphatic amines, amide amines, amido amines, imidazoles, aliphatic tertiary amines, aromatic amines, cycloaliphatic amines, heterocyclic amines, polyamides, polyethylamines and carboxylic acid anhydrides. Of these, aliphatic amines, aromatic amines and carboxylic acid anhydrides are the most suitable. Examples of suitable aliphatic and aromatic amine hardening agents are triethylenetetraamine, ethylenediamine, N-cocoalkyltrimethylenediamine, isophoronediamine, diethyltoluenediamine and tris (dimethylaminomethylphenol). Examples of suitable carboxylic acid anhydrides are methlytetrahydrophthalic anhydride, hexahydrophthalic anhydride, maleic anhydride, polyazelaic polyanhydride and phthalic anhydride.

Of the foregoing amines and anhydrides, triethylenetetraamine, ethylenediamine, N-cocoalkyltrimethylenediamine, isophoronediamine, diethyltoluenediamine and tris (dimethylaminomethylphenol) are preferred, with isophoronediamine, diethyltoluenediamine and tris (dimethylaminomethylphenol) and mixtures of such hardening agents being the most preferred. The hardening agent or agents utilized are generally included in the epoxy compositions of the present invention in an amount in the range of from 2% to about 40% by weight of the compositions.

In order to prolong the time in which the slag cement in the sealing compositions of this invention sets (to allow sufficient pumping time), a set retarder may be included in the compositions. Examples of set retarders which can be utilized include, but are not limited to, calcium lignosulfonate, sodium calcium lignosulfonate, a mixture of sulfomethylated lignosulfonates and tartaric acid, gluonodeltalactone, a copolymer of acrylic acid and AMPS® and chromium lignosulfonate. When used, the set retarder is generally present in the sealing compositions in an amount in the range of from about 0.1% to about 3% by weight of slag cement in the compositions.

A preferred well sealing composition of this invention is comprised of slag cement; a slag cement activator comprised of a mixture of sodium hydroxide and sodium carbonate present in an amount of about 2.57% by weight of slag cement in the composition; water present in an amount of about 46% by weight of slag cement in the composition; a hardenable epoxide containing liquid comprised of the diglycidyl ether of 1,4-butanediol present in an amount of about 7% by weight of slag cement in the composition; and an epoxide containing liquid hardening agent comprised of diethyltoluenediamine present in an amount of about 2.4% by weight of slag cement in the composition.

When required, the above described composition also includes a retarding agent comprised of sodium calcium lignosulfonate present in an amount in the range of from about 1% to about 1.5% by weight of slag cement in the composition.

As will be understood by those skilled in the art, the sealing compositions of this invention can also include a variety of known additives for imparting desired properties to the compositions such as fluid loss control additives, weighting additives and the like.

The methods of the present invention for sealing a subterranean formation or zone penetrated by a well bore are basically comprised of the steps of preparing a sealing composition of the present invention as described above, placing the sealing composition in the formation or zone to be sealed and then allowing the slag cement to set and the epoxide containing material to harden. As mentioned, the sealing compositions of this invention set and harden into substantially impermeable cementious masses having high compressive, tensile and flexural strengths.

In order to further illustrate the compositions and methods of this invention, the following examples are given.

EXAMPLE 1

A slag cement slurry was prepared containing slag cement, water, a set retarder and a mixture of sodium hydroxide and sodium carbonate set activators. The thickening time of the slurry at 140° F. was determined. The slurry was then allowed to set and tests for its compressive strength, tensile strength, shear bond and gas permeability were conducted in accordance with the procedures set forth in the API Specification for Materials and Testing for Well Cements, API Specification 10, 5th ed., dated Jul. 1, 1990, of the American Petroleum Institute which is incorporated herein by reference. In addition, mechanical properties of the set composition including yield strength, Young's Modulus and Poisson's Ratio were determined in accordance with the procedures of the American Society for Testing and Materials (ASTM) set forth, for example, in ASTM Testing Procedure D1456. The test apparatus used in determining the mechanical properties is described in U.S. Pat. No. 5,325,723 issued to Meadows, et al. on Jul. 5, 1994. Young's Modulus and Poisson's Ratio describe the elastic properties of the tested samples.

Additional slag cement slurries containing sodium hydroxide and sodium carbonate activators were prepared which were identical to the first slag cement slurry described above except that amounts of an epoxide containing liquid and a hardening agent were combined with the slurries in accordance with the present invention. The test compositions containing the epoxide and hardening agent were tested in the same manner as described above for the slag cement slurry which did not include epoxide and hardening agent.

The components of the various compositions which were tested and their quantities are set forth in Table I below. The test results are set forth in Tables II and III below.

TABLE I

SLAG CEMENT COMPOSITIONS

| Composition No. | Water, grams | Slag Cement, grams | Slag Cement Set Activators NaOH | Slag Cement Set Activators $Na_2CO_3$ | Set[1] Retarder, grams | Epoxide[2] Containing Liquid | Epoxide[3] Hardening Agent |
|---|---|---|---|---|---|---|---|
| 1 | 350 | 700 | 4 | 14 | 7 | — | — |
| A | 350 | 700 | 4 | 14 | 7 | 50 | — |
| B | 350 | 700 | 4 | 14 | 7 | 50 | 16.5 |
| C | 300 | 700 | 3.4 | 12 | 7 | 50 | 16.5 |
| D | 300 | 700 | 4 | 14 | 7 | 50 | — |
| E | 325 | 700 | 3.4 | 12 | 7 | 25 | 8.2 |

[1]HR-7
[2]Diglycidyl ether of 1,4-butanediol
[3]Diethyltoluenediamine

TABLE II

TEST RESULTS

| Composition No. | Thickening Time @ 140° F., hr:min | Compression Strength, psi | Tensile Strength, psi | Shear Bond, psi | Test Pressure, psi | Gas Permeability, md. |
|---|---|---|---|---|---|---|
| 1 | 3:30 | 1593 | 233 | 110 | 800 | 0.503 |
| A | 3:55 | 1516 | 235 | 200 | 1000 | 0.024 |
| B | 3:45 | 1517 | 267 | 250 | 1000 | 0.009 |
| C | 3:05 | 1826 | 351 | 311 | 1000 | 0.0001 |
| D | — | 1210 | 180 | 266 | 1000 | 0.026 |
| E | — | 1020 | 140 | 415 | 1000 | 0.0006 |

TABLE III

TEST RESULTS

| Composition No. | Confining Pressure, psi | Yield Strength, psi | Young's Modulus, psi | (+/−E[6]) | Poisson's Ratio |
|---|---|---|---|---|---|
| 1 | 0 | 1577 | 0.7 | 0.0023 | 0.13733 ± 0.000623 |
| 1 | 500 | 2333 | 0.032 | 0.002 | 0.15486 ± 0.020512 |
| 1 | 1000 | 2423 | 0.38 | 0.0134 | 0.171723 ± 0.046556 |
| A | 0 | 1225 | 0.645 | 0.0037 | 0.167123 ± 0.000767 |
| A | 500 | 1558 | 0.178 | 0.0062 | 0.225325 ± 0.023784 |
| A | 100 | 1909 | 0.104 | 0.0040 | 0.08845 ± 0.008988 |
| B | 0 | 1088 | 0.543 | 0.0028 | 0.161625 ± 0.000611 |
| B | 500 | 1712 | 0.302 | 0.0026 | 0.109525 ± 0.012124 |
| B | 1000 | 2114 | 0.122 | 0.0025 | 0.131562 ± 0.005611 |
| C | 0 | 1629 | 0.904 | 0.0039 | 0.187083 ± 0.000724 |
| C | 500 | 2515 | 0.400 | 0.0070 | 0.116255 ± 0.028589 |
| C | 1000 | 2425 | 0.397 | 0.0050 | 0.148406 ± 0.010616 |
| D | 0 | 1565 | 0.119 | 0.0023 | 0.266259 ± 0.000631 |
| D | 500 | 2136 | 0.405 | 0.0031 | 0.151948 ± 0.011883 |
| D | 1000 | 2242 | 0.313 | 0.0046 | 0.119605 ± 0.024662 |
| E | 0 | 1877 | 0.926 | 0.0027 | 0.188194 ± 0.000748 |
| E | 500 | 2182 | 0.514 | 0.0032 | 0.228949 ± 0.011134 |
| E | 1000 | 2062 | 0.333 | 0.0045 | 0.192076 ± 0.016613 |

From the test results set forth above it can be seen that the test compositions of the present invention (compositions A through E) have excellent compressive, tensile and shear bond strengths and are substantially impermeable to gas. This is in comparison to the prior art slag cement composition (composition 1) which had relatively low shear bond strength and high gas permeability.

The mechanical property test results set forth in Table III clearly show that as the confining pressure is increased, the hardened epoxide contained in the test compositions allowed deformation to occur without failure. When the slag cement compositions without epoxide were subjected to the same test, they failed and rubberized. The test compositions containing hardened epoxide did not show shear failure in spite of the fact that they underwent large deformations. Even though the samples including hardened epoxide may have experienced yield failure, they did not exhibit any permanent damage and ultimately return to their original shapes and characteristics.

What is claimed is:

1. An improved method of scaling a subterranean zone penetrated by a well bore utilizing a slag cement sealing composition comprising the steps of:

(a) preparing a slag cement sealing composition that does not shrink and form micro cracks therein upon setting and as a result is substantially impermeable to gases and liquids consisting essentially of slag cement, a slag cement set activator, water, a hardenable epoxide containing material and an epoxide containing material hardening agent;

(b) placing said slag cement sealing composition in said zone; and (c) allowing said slag cement sealing composition to set and said epoxide containing material therein to harden.

2. The method of claim 1 wherein said slag cement set activator in said composition is selected from the group consisting of lime, Portland cement, sodium hydroxide, sodium carbonate, sodium silicates, alkali metal sulfates, magnesia and mixtures thereof, said slag cement set activator being present in an amount in the range of from about 8% to about 20% by weight of said slag cement in said composition.

3. The method of claim 1 wherein said water in said sealing composition is present in an amount in the range of from about 30% to about 60% by weight of slag cement in said composition.

4. The method of claim 1 wherein said hardenable epoxide containing material in said composition is a liquid selected from the group of the diglycidyl ether of 1,4-butanediol, the diglycidyl ether of neopentylglycol and the diglycidyl ether of cyclohexanedimethanol.

5. The method of claim 4 wherein said hardenable epoxide containing material in said composition is present in an amount in the range of from about 3% to about 50% by weight of slag cement in said composition.

6. The method of claim 1 wherein said epoxide containing material hardening agent is at least one member selected from the group of triethylenetetraamine, ethylene-diamine, N-cocoalkyltrimethylenediamine, isophoronediamine, diethyltoluenediamine and tris (dimethylaminomethylphenol).

7. The method of claim 6 wherein said epoxide containing material hardening agent in said composition is present in an amount in the range of from about 2% to about 40% by weight of said slag cement in said composition.

8. The method of claim 1 wherein said composition includes an effective amount of a set retarder.

9. An improved method of sealing a subterranean zone penetrated by a well bore utilizing a slag cement sealing composition comprising the steps of:

(a) preparing a slag cement sealing composition that does not shrink and form micro cracks therein upon setting and as a result is substantially impermeable to gases and liquids consisting essentially of slag cement, a slag cement set activator comprised of a mixture of sodium hydroxide and sodium carbonate, water, a hardenable epoxide containing liquid selected from the group consisting of the diglycidyl ether of 1,4-butanediol, the diglycidyl ether of neopentylglycol and the diglycidyl ether of cyclohexanedimethanol and an epoxide containing liquid hardening agent selected from the group consisting of isophoronediamine, diethyltoluenediamine, tris (dimethylaminomethylphenol) and mixtures of such hardening agents;

(b) placing said slag cement sealing composition in said zone; and (c) allowing said slag cement sealing composition to set and said epoxide containing liquid therein to harden.

10. The method of claim 9 wherein said slag cement set activator is present in an amount in the range of from about 8% to about 20% by weight of said slag cement in said composition.

11. The method of claim 9 wherein said water is present in an amount in the range of from about 30% to about 60% by weight of said slag cement in said composition.

12. The method of claim 9 wherein said hardenable epoxide containing liquid is present in an amount in the range of from about 3% to about 50% by weight of said slag cement in said composition.

13. The method of claim 9 wherein said epoxide containing liquid hardening agent is present in an amount in the range of from about 2% to about 40% by weight of said slag cement in said composition.

14. The method of claim 9 wherein said slag cement sealing composition includes an effective amount of a set retarder selected from the group consisting of calcium lignosulfonate, sodium calcium lignosulfonate, a mixture of sulfomethylated lignosulfonates, gluconodeltalactone, a copolymer of acrylic acid and AMPS® and chromium lignosulfonate.

15. An improved method of sealing a subterranean zone penetrated by a well bore utilizing a slag cement sealing composition comprising the steps of:

(a) preparing a slag cement sealing composition that does not shrink and form micro cracks therein upon setting and as a result is substantially impermeable to gases and liquids consisting essentially of slag cement, a slag cement set activator comprised of a mixture of sodium hydroxide and sodium carbonate present in an amount of about 2.57% by weight of slag cement in said composition, water present in an amount of about 46% by weight of slag cement in said composition, a hardenable epoxide containing liquid comprised of the diglycidyl ether of 1,4-butanediol present in an amount of about 7% by weight of slag cement in said composition and an epoxide containing liquid hardening agent comprised of diethyltoluenediamine present in an amount of about 2.4% by weight of slag cement in said composition;

(b) placing said slag cement sealing composition in said zone; and (c) allowing said slag cement sealing composition to set and said epoxide containing liquid therein to harden.

16. The method of claim 14 which includes a retarding agent comprised of sodium calcium lignosulfonate present in an amount in the range of from about 1% to about 1.5% by weight of slag cement in said composition.

* * * * *